United States Patent [19]
Steiner

[11] 4,355,211
[45] Oct. 19, 1982

[54] PUSH BUTTON KEY MODULES

[75] Inventor: Frederick Steiner, Stapleford, England

[73] Assignee: Plessey Overseas Limited, Ilford, England

[21] Appl. No.: 233,207

[22] Filed: Feb. 10, 1981

[30] Foreign Application Priority Data

Feb. 13, 1980 [GB] United Kingdom ................. 8004768

[51] Int. Cl.³ ............................................. H04M 1/23
[52] U.S. Cl. .......................... 179/90 K; 240/365 VL; 200/309
[58] Field of Search .................... 340/365 R, 365 VL; 200/5 N, 5 P, 309, 5 EA; 179/90K, 178; 400/490, 495

[56] References Cited

U.S. PATENT DOCUMENTS 3,499,515 3/1970 Mikrut ........................ 340/365 VL
3,946,171 3/1976 Kuhfus ............................... 200/309

FOREIGN PATENT DOCUMENTS 55-131835 10/1980 Japan ............................ 340/365 R

OTHER PUBLICATIONS

*IBM Technical Disclosure Bulletin*, "Quick Changeable Keytop Indicia", D. L. Potak, 9-1969, vol. 12, No. 4.
"Interchangeable Keybutton Group Assembly", *IBM Technical Disclosure Bulletin*, Campbell and Hayes, vol. 20, No. 6, Nov. 1977.

*Primary Examiner*—Gerald L. Brigance
*Attorney, Agent, or Firm*—Fleit & Jacobson

[57] ABSTRACT

The invention enables individual buttons to be replaced on a push-button telephone without disturbing the other buttons.

Each button is retained in position by lugs formed on the lower portion of the button which engage underneath the edges of a hole formed in the body of the telephone. The edges of the hole are provided with slots and by sliding the button until the lugs become aligned with the slots, the button can be removed. A cover or escutcheon plate fits over the buttons to prevent inadvertent sliding and consequent removal of the buttons.

5 Claims, 7 Drawing Figures

PUSH BUTTON KEY MODULES

Figure 1:
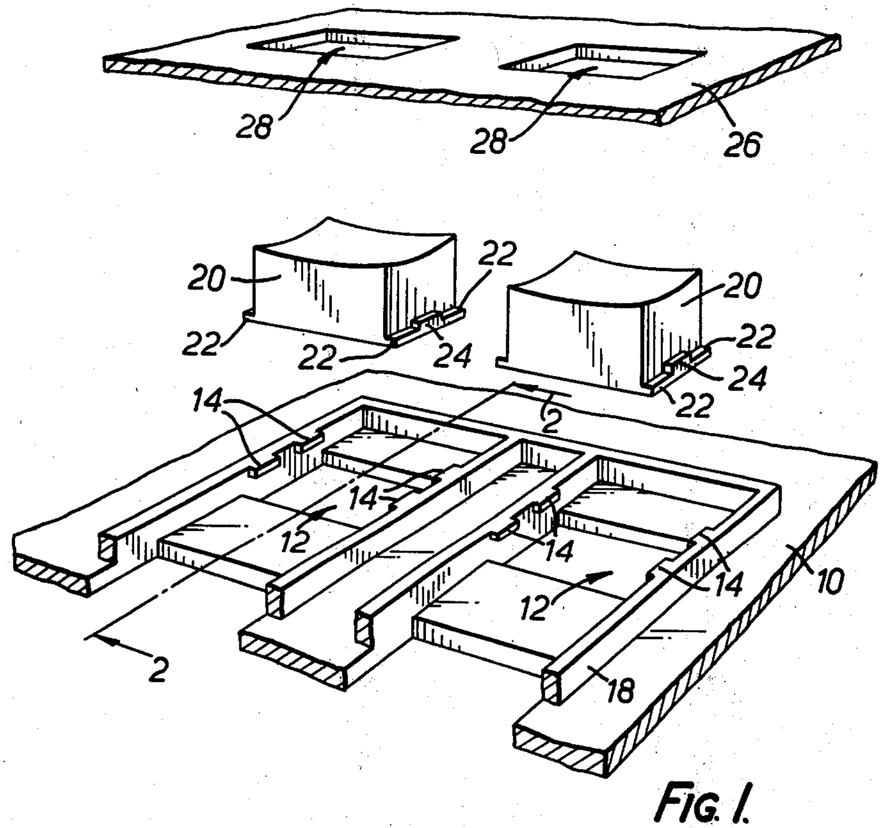

The invention relates to push button key modules which are particularly suitable for, but not exclusively so, push button type telephones.

This type of telephone normally comprises a plurality of spaced buttons or keys (usually twelve in number) each key being mounted over a pair of contacts so that when the key is depressed the contacts make. A suitable spring urges the key upwards. The contacts and the springs are normally mounted on the body of the telephone and the keys loosely mounted over them, the keys being retained in position on the body of the telephone by a cover or an excutcheon plate having suitable shaped spaced orifices formed therein. The keys are retained by the excutcheon plate by flanges formed on the lower ends of the keys which engage the underside of the escutcheon plate. Alternatively the keys may be fixed to stems on the key mechanism.

It is desireable to be able to replace individual keys without disturbing the other keys and it is an object of the present invention therefore to provide a push button key module in which this can be achieved.

According to the present invention a push button key module comprises a plate member with a plurality of orifices formed therein, a plurality of keys, each being adapted to be mounted adjacent to an orifice, each orifice being formed with a projection extending partially into the orifice and each key being provided at its end with a flange portion such that when the projection and the flange portion are not in alignment, the key can pass completely through the orifice, the key being displaceable on the plate member whereby the projection and the flange portion can move into alignment and the key is prevented from passing through the plate member by contact between the projection and the flange portion, a further plate member mounted on the plate member retaining each key in a position in which the projection and the flange portion are in alignment and spring means urging the flange portions and the projections together.

Preferably each orifice is provided with at least two projections and each key is provided with at least two flange portions.

Preferably at least one projection is located on each opposite side only of a rectangular shaped orifice in the plate member, and at least one flange portion is located on each opposite side only of a key having a corresponding rectangular shaped cross-section.

The projections preferably extend upwards from the plane of the plate member whereby when a key is positioned with the projections and flanges in alignment the base of the key is located substantially in the same plane as the plate member.

The projections may extend over the full length of opposite sides of each rectangular orifice and the flanges may extend over the full width of opposite sides of each key.

Alternatively several spaced projections may be formed on opposite sides of each orifice, and several spaced flanges may be formed on opposite sides of each key.

Preferably two spaced projections are formed on opposite sides of each orifice, and a single continuous flange is formed on opposite sides of each key, a locating member being mounted or formed on each flange which is adapted to locate in the space between the two projections and thereby locate the key with the flanges in alignment with the projections.

The locating members may be rectangular or semicircular or any other suitable shape.

Figure 2:
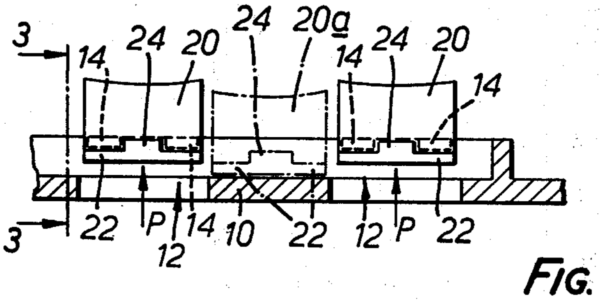
Figure 3:
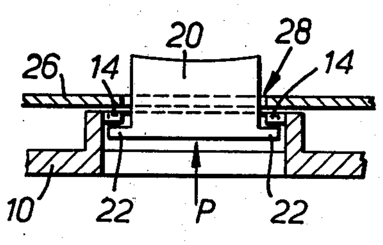
Figure 5:
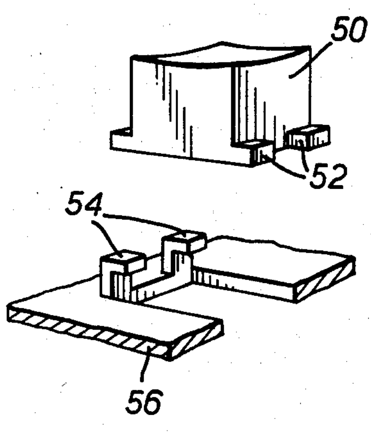
Figure 6:
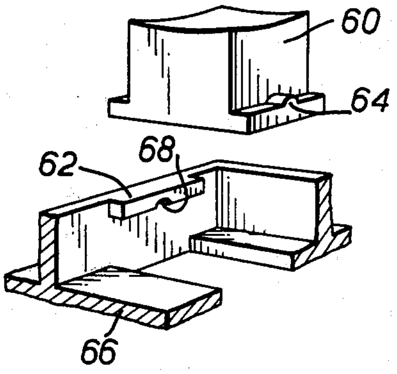
Figure 7:
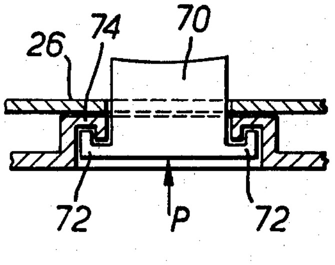

Embodiments of the invention will now be described by way of example only with reference to the accompanying drawings in which:

FIG. 1 is a three dimensional exploded view of part of a push button key module according to the invention, FIG. 2 is a part cross-sectional view of the module along the line 2—2 in FIG. 1, FIG. 3 is a part cross-sectional view of a completely assembled module along the line 3—3 in FIG. 2, FIGS. 4, 5 and 6 are three dimensional views showing different key arrangements, and FIG. 7 is a modified version of the key shown in the module shown in FIG. 3.

The push button key module comprises basically a plate member 10, which forms part of the dial assembly of a telephone. This is provided with twelve rectangular holes 12 (only two of which are shown in FIG. 1).

Along two opposite sides of each hole 12 are formed four shoulders 14 which project upwardly from the plane of the plate member 10 and partly across the hole.

Intended to fit into the holes 12 are square keys 20, two of which are shown in FIG. 1. The upper or body parts of the keys are of such a size as to be able to pass through the holes 12 and between the ends of the inwardly projecting shoulders 14. Each key 20 however is provided on two opposite sides with flanges 22 each flange being provided with an upwardly projecting portion 24 between the ends of the flanges. The flanges 22 will not pass between the shoulders 14 when they are aligned with the hole 12, but each key 20 is moveable sideways along the surface of the plate member 10 until the flanges 22 and the portions 24 pass beneath the shoulders 14. When the portions 24 are aligned with the spaces between the shoulders 14 which are slightly wider than the portions 24, the key 20 is lifted slightly under the action of a spring force P so that the flanges 22 abut the undersides of the shoulders 14 and the key 20 is held in position by the portions 24.

FIG. 2 is a cross-sectional view through part of the plate member 10 along the line 2—2 in FIG. 1 with two keys 20 mounted in position and a key 20*a* shown in chain-dotted lines in the insertion position in which the flanges 22 are clear of the shoulders 14. Removal of a key is readily achieved by slightly depressing the key against the spring force P, and sliding the key along the top surface of the plate member 10 until it is clear of the shoulders 14 and in the position of the key 20*a*.

FIG. 3 is a cross-sectional view through part of the plate member 10 along the line 3—3 in FIG. 2 on to which has been mounted an escutcheon plate or telephone body 26. The body or plate 26 is provided with holes 28 which are a close fit around the upper parts of the keys 20. When the escutcheon plate or body 26 is fitted, the portions 24 and the spaces between the shoulders 14 are in alignment and no sideways movement of the keys 20 can take place. The keys are thus securely held in position.

When it is desired to replace one of the keys, the escutcheon plate or telephone body 26 is removed, and the required key 20 is removed by slightly depressing it and sliding it sideways until the shoulders 14 and the flanges 22 come out of alignment (as the key 20*a* in FIG. 2). The remaining keys are held in position by the action of the spring force P and hence cannot be removed without a definite slight depression and a sideways movement. A new key is inserted by placing the key in the position of the key 20a in FIG. 2 and sliding the key sideways.

Thus individual keys can readily be replaced without the risk of other keys falling off the body of the telephone during handling.

Figure 4:
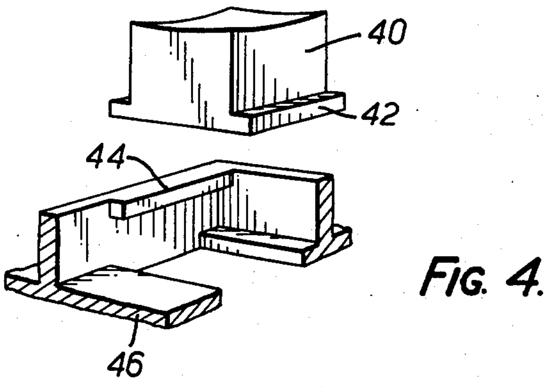

In FIG. 4 a key 40 is virtually identical to the keys 20 but no upwardly projecting portion such as the portion 24 is provided on flanges 42 extending along opposite sides of the key, and a single continuous shoulder 44 is provided on a base plate 46. No slight depression of the key is required to remove this key.

FIG. 5 illustrates a key 50 which has four short flanges 52, one at each corner of the key. The flanges 52 are adapted to slide underneath four separate shoulders 54 formed on a base plate 56. Since the spaces between the flanges 52 are slightly greater than the width of the shoulders 54 the key 50 can be removed by sliding it only one third of the length of the base of the key and lifting it so that one pair of the shoulders passes through the spaces between the flanges 52.

FIG. 6 illustrates a key 60 very similar to the key 20 but the rectangular portions 24 are replaced by semicircular shaped portions 64. These are adapted to fit into semicircular shaped recesses 68 formed on the underside of a continuous shoulder 62 instead of in the spaces between the shoulders 14.

FIG. 7 illustrates a more secure method of holding a key 70 by providing flanges 72 with upturned portions which are adapted to fit into grooves formed in shoulders 74. Additional projecting portions such as the portions 24 or 64 may be provided on the flanges 72.

What we claim is:

1. A push button key module comprising a plate member with a plurality of orifices formed therein, said plate member having a plurality of projections spaced from the surface of said plate, two of said projections extending into line with each of said orifices from opposite sides thereof, a plurality of keys, each of said keys being capable of passing through an orifice in said plate member and being provided on opposite sides with flanges, said two projections and said flanges being in alignment when said key is aligned with one of said orifices, spring means associated with each orifice such that when a key is aligned with an orifice said spring means urges said key until said flanges contact said two projections and said key passes into said orifice when moved to overcome said spring means, each key being displaceable in a direction parallel to the plane of said plate member until each key is out of alignment with an orifice and said flanges are out of alignment with said projections whereby said key is removeable from said plate member, and a further removeable plate member mounted on said plate member, said further plate member retaining said keys in alignment with said orifices in said plate member.

2. A key module as claimed in claim 1 in which when a key is positioned with said projections and flanges in alignment the base of the said key is located slightly above the plane of said plate member.

3. A key module as claimed in claim 1 in which said projections extend over the full length of opposite sides of each rectangular orifice and said flanges extend over the full width of opposite sides of each key.

4. A key module as claimed in claim 1 in which several spaced projections are formed on opposite sides of each orifice, and several spaced flanges are formed on opposite sides of each key.

5. A key module as claimed in claim 1 in which two spaced projections are formed on opposite sides of each orifice, and a single continuous flange is formed on opposite sides of each key, a locating member being mounted or formed on each flange which is adapted to locate in the space between the two projections and thereby locate the key with the flanges in alignment with the projections.

* * * * *